April 20, 1943.  W. A. WERNER  2,317,008
DENTAL RESTORATION
Filed May 29, 1941  3 Sheets-Sheet 1

WILBERT A. WERNER
INVENTOR.
BY Eugene M Gile
Atty

April 20, 1943.  W. A. WERNER  2,317,008
DENTAL RESTORATION
Filed May 29, 1941  3 Sheets-Sheet 2

WILBERT A. WERNER
INVENTOR.
BY Eugene M. Giles
Atty.

April 20, 1943.  W. A. WERNER  2,317,008
DENTAL RESTORATION
Filed May 29, 1941  3 Sheets-Sheet 3

Inventor:
WILBERT A. WERNER
By Eugene M. Giles
Attorney

Patented Apr. 20, 1943

2,317,008

UNITED STATES PATENT OFFICE 2,317,008

DENTAL RESTORATION

Wilbert A. Werner, Western Springs, Ill.

Application May 29, 1941, Serial No. 395,716

7 Claims. (Cl. 18—55.1)

My invention relates to dental restorations such as inlays, crowns, bridges, dentures and the like and has reference more particularly to a method of and facilities for producing such restorations readily and perfectly from a compressed plastic.

Dental restorations of the character to which this invention relates are ordinarily made by compressing and heat processing suitable plastic material in a mold. A special mold is required for each restoration and it is the prevailing practice to make these molds of dental plaster, which is applied in a plastic condition and in separable portions on a wax impression or model of the particular restoration so that when the plaster hardens a mold is produced of half sections which are separable for removal of the wax impression or model and for filling the mold cavity with the plastic material to make the final restoration.

It is important for satisfactory results that the plastic material fill the mold cavity completely with sufficient quantity allowance to insure substantial compression of the material in the mold cavity when the mold is fully closed, and in the absence of a better technique this is accomplished by a cut and try method wherein a suitably prepared plastic of moldable consistency and in ample quantity to overfill the mold cavity is placed therein and the mold closed thereon sufficiently to compress and shape the plastic in the mold cavity and squeeze the excess into the parting between the half sections of the mold. The mold is then opened and the extruded excess, which is in the form of a fin, is trimmed off and the compressing and trimming operation repeated until it is thought that the proper quantity of plastic remains for final compression and processing. The mold is then closed tightly to compress the final quantity of plastic in the cavity and subjected to heat to process and harden the plastic, after which the molded plastic article is removed, usually by chiseling and figging away the plaster of the mold, and the removed article is then polished.

This prevailing method of making dental restorations has many disadvantages. It is a tedious job requiring painstaking care and extraordinary skill and involves uncertainties as to accuracy of reproduction and proper density of material for needed strength and durability. An expensive plastic which is specially prepared for the particular molding technique is required and the ultimate physical properties of the plastic are not utilized because of low molding temperature and low degree of compression. Internal weaknesses, bubbles and mold distortions frequently occur. A fin is invariably formed at the parting line of the mold if the mold cavity is sufficiently filled to insure adequate compression and the presence of this fin necessarily prevents perfect closing together of the mold sections with a corresponding oversize of the restoration in the direction of mold closing. Moreover the fin must be removed from the finished product and in the removal of this fin, as well as in digging the article out of the plaster mold, the product is likely to be damaged.

Moreover the plaster mold does not produce as smooth a surface as is desired for dental restorations. Attempts have been made to overcome this lack of smooth surface by applying metal foil on the wax impression or model before investing in the plaster mold so as to provide a metal foil lining in the mold cavity when the wax impression or model is removed therefrom but the application of the metal foil to the wax impression or model is an extremely difficult and tedious operation and entirely impracticable with some forms of dental restorations.

To avoid these disadvantages and difficulties of prior practice, I invest the wax impression or model of the desired restoration in an undivided mold which is made of a material and in a manner to conform intimately and with great precision to the contour and surface characteristics of the wax impression or model and which not only readily withstands the pressure and heat required for appropriately processing the plastic but is removable by decomposition from the finished product without the slightest danger of injury to the final product. The wax impression or model is melted out of the cavity of this mold through a small vent opening after which the plastic is injected under high pressure through an attached sprue into the mold cavity to form the finished product. Thus an exact and perfect reproduction in plastic is produced of the wax impression or model without the objectionable fin and oversize variable resulting therefrom in the making of dental restorations in the previous plaster molds. Small stems of plastic are formed on the plastic restoration at the sprue and vent openings, but these are easily removable without danger of injury to the restoration.

The principal objects of my invention are to provide improved dental restorations and simplify the making thereof; to provide an improved method and improved facilities whereby dental restorations may be made conveniently and perfectly from plastic or the like; to permit the ultimate physical properties of the plastic to be utilized in dental restorations; and to insure accuracy of product with satisfactory surface finish for dental purposes, these and other objects being accomplished as pointed out hereinafter and as shown in the accompanying drawings in which Fig. 1 is a perspective view of a tooth illustrative of a cavity for which an inlay may be provided in accordance with my invention;

Figures 1, 2:
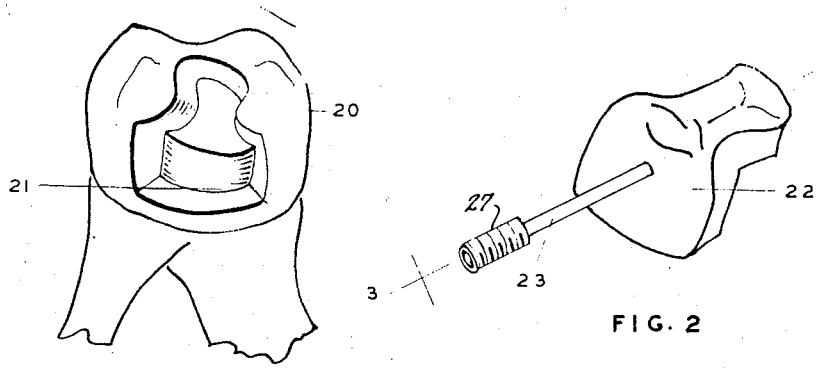
Fig. 2 is a perspective view of a wax impression or model as prepared for making an inlay in accordance with my invention for the cavity of Fig. 1.
Figure 3:
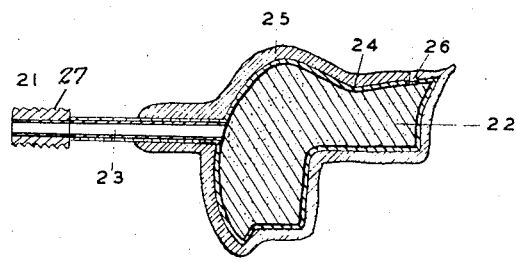
Fig. 3 is a view showing the wax impression of Fig. 2 in section on the line 3—3 of Fig. 2 and invested in the mold which is likewise in section.

Referring now to the drawings, and particularly to Figs. 1, 2 and 3 thereof, the reference numeral 20 indicates a tooth which has been drilled out in conventional manner to provide a cavity 21 suitable for an inlay. A wax impression of the cavity 21 is then made in the usual manner by filling said cavity with suitable molding wax and contouring the exterior surfaces thereof in accordance with the normal contour of the tooth 20 so as to provide a model or pattern for the inlay.

Thereafter, in accordance with my invention this wax pattern is luted to a metal sprue 23 and coated as at 24 throughout the entire surface, with an electrically conductive substance, as for example by painting with a conductive paint or pure finely divided metallic powder, or by coating with a precipitated film of silver, copper, or gold, or powdered graphite, or other conductive substances, care being taken to continue the conductive coating into intimate contact with the sprue 23.

While I prefer to paint the wax impression 22 with a finely divided metallic powder I have also found it advantageous to apply a silver coating by precipitation which may be applied as follows.

First, a reducing solution is prepared by mixing together

| | |
|---|---|
| Distilled water | cc  700 |
| Pure sugar | gms  80 |
| Ethyl alcohol (C₂H₅OH) | cc  175 |
| Nitric acid (HNO₃) | cc  3 | and then adding sufficient water to bring the volume of this reducing solution up to 1000 cc.

A silver nitrate solution is prepared by dissolving 1 gm. of silver nitrate (AgNO₃) in 100 cc. of water and adding thereto sufficient ammonium hydroxide (NH₄OH) to produce immediate precipitation. A further quantity of ammonium hydroxide is then added to cause almost all of the precipitate to dissolve. Another solution of potassium hydroxide (KOH) is also prepared consisting of 1 gm. of potassium hydroxide salt dissolved in 100 cc. of water.

Then a quantity of the potassium hydroxide solution equivalent to ½ the volume of the silver nitrate and ammonium hydroxide solution is added to the latter solution, thus causing another precipitate to form. More ammonium hydroxide is then added until the precipitate is again almost dissolved.

The wax pattern 22 which is to be silver coated is then immersed in this final solution and a volume of the reducing solution equal to 1/25 of the volume of said final solution is added to the latter and the silver coating then deposits upon all surfaces of the immersed wax pattern 22.

After this conductive coating 24 has been applied, the entire surface of the wax pattern 22 and an adjoining portion of the sprue 23 has a relatively thick metallic coating 25 applied thereon, preferably by electro-deposition so as to form a strong undivided mold. This may be done by connecting the sprue 23 with one terminal of an electrical circuit and immersing the conductive coated wax pattern and part of the sprue in a plating solution, such as calcium sulphate (CaSO₄) (16° Baumé) solution, containing a plating strip, for example a copper strip for copper plating, to which the other terminal of the electrical circuit is connected. As an electric current is passed through the circuit copper is transferred from the plating strip and deposited on the wax pattern 22 and sprue 23, upon all of the areas which are coated with the conductive substance 24. The thickness of the metallic coating 25 upon the wax pattern 22 and the sprue 23 can be controlled by the length of time the process is continued, it being preferable to build up a coating 24 of sufficient thickness to withstand a high degree of internal pressure. For this purpose a coating $\frac{1}{32}''$ is usually adequate. After the metal coating or mold 25 has been completed, a vent hole 26 is provided by drilling through the metallic coating 25 at the portion thereof remote from the sprue. This vent hole 26 may be provided, however, by attaching a thin wax stem to the wax pattern 22 prior to application of the metallic coating, in which event the conductive coating 24 is removed from the tip of the stem before the electro-plating so that metal will not be deposited thereon. Thus when the metallic coating 25 has been applied a wax filled opening 26 remains with the wax filling exposed at the outer end.

If desired, the metal mold 25 may be reinforced or strengthened by embedding in plaster or other suitable material in a flask, in which event, of course the vent hole 26 is continued on through the plaster or other reinforcing.

The combined wax pattern 22 and the metallic coating 25 are then heated so that the wax pattern 22 is melted and the melted wax is then evacuated through the small opening 26 in the metal coating 25.

The metallic coating 25 when empty contains a cavity corresponding exactly to the wax pattern 22 and accordingly corresponds exactly to the inlay required for the tooth cavity 21. The sprue 23 to which the metallic mold 25 is attached is then connected to any suitable apparatus (not shown) for injecting a plastic material. The connection is made to said apparatus with a standardized connection 27 on the end of the sprue 23. Fluid plastic material such as acrylic or styrene resin or the like is then injected under appropriate pressure into the interior of the metallic mold, as for example by hydraulic pressure of a screw feed, the air in the mold escaping through the small opening 26, and after the mold is completely filled the plastic is allowed to set and harden in the mold. Prior to injection of plastic material into the metallic mold 25, said mold is preferably heated in order to obtain sufficient expansion so that it will compensate for the shrinkage of the mold and plastic on cooling.

The plaster material may be supplied in cylinders and injected therefrom into the mold, and a number of cylinders may be provided, each with a different shade or tint of plaster, corresponding to natural tooth colors, so that the proper plaster may be selected and used which matches the color of the tooth to be repaired or matches the color of adjoining teeth if a tooth replacement is to be made.

The plastic reproduction thus molded is of exactly the same size and shape as the wax pattern 22 and is removed from the metallic mold 25 by any of several desolidification methods as may be preferred which will decompose the mold. It may be removed conveniently, for example, with nitric acid or by merely reversing the electro-deposition process of forming the mold so that the metal is removed therefrom and is redeposited on the strip which provides the metal for the coatings. After the metal coating is entirely removed, the sprue 23 and the plastic stem therein, and also the plastic stem formed by the small opening 26, are removed from the molded inlay, and said inlay is then ready for installation in the cavity 21 in the tooth 20 and this is done in the usual manner by cementation.

Figure 4:
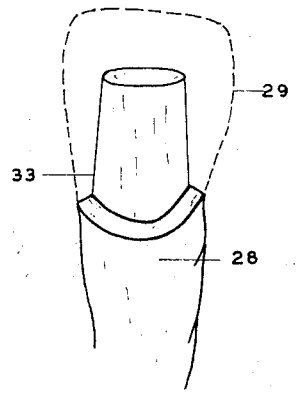
Fig. 4 is a perspective view showing a tooth prepared for a crown type of restoration and with a wax model of the restoration shown in dotted lines thereon.
Figures 5, 6:
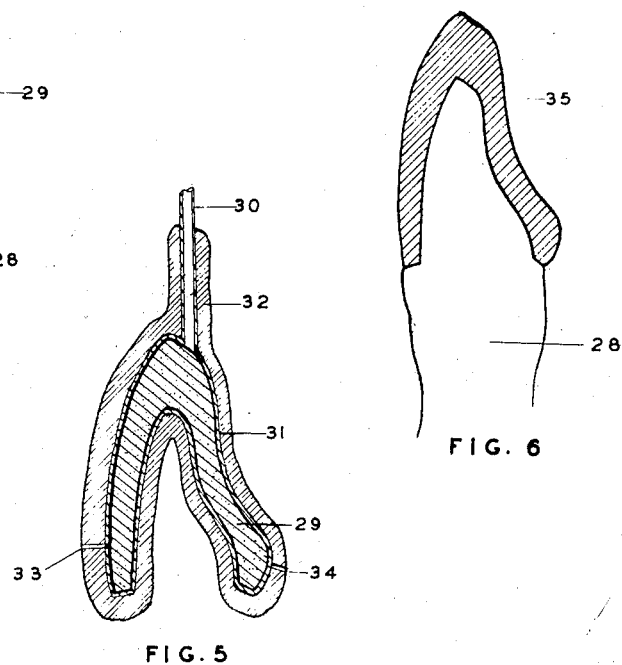
Fig. 5 is a cross sectional view of a mold for making a crown for the tooth of Fig. 4.
Fig. 6 is a sectional view of the tooth of Fig. 4 with the plastic crown applied thereon.

Dental crowns are made by a modified application of the same process as illustrated in Figs. 4, 5 and 6. The tooth 28 is cut down as shown at 33 in Fig. 4 and the original contour of the tooth is then restored in wax, as indicated by the dotted line 29 in said figure. A sprue 30 is luted to the wax pattern 29 and the assembly is then given a conductive coating 31 as was done in making the inlay heretofore described. Likewise a metallic coating 32 is deposited upon or applied to the wax pattern and sprue assembly to form the mold. Vent openings 33 and 34 are provided through the metallic coating 32. The plastic is injected in the same manner as was done in the molding of the inlay. Also, the metallic coat 32, sprue 30, and the plastic projections formed in the sprue 30 and the openings 33 and 34 are removed in the manner heretofore described. The plastic crown 35 is then cemented in place on the tooth 28.

Figure 7:
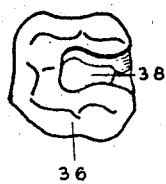
Fig. 7 shows two non-adjacent teeth drilled out with cavities for anchoring an intervening artificial tooth thereto.
Figure 7:
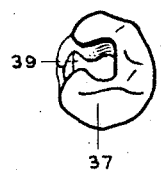
Figure 8:
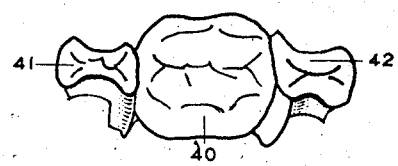
Fig. 8 is a perspective view of an artificial tooth prepared for mounting between the teeth of Fig. 7.
Figure 9:
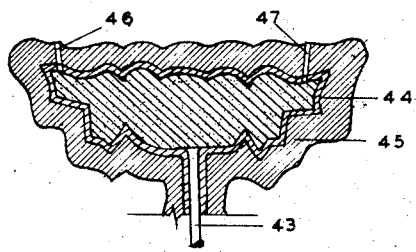
Fig. 9 is a sectional view of a mold for a dental bridge.

This method is also adapted to the making of dental bridgework as indicated in Figs. 7, 8 and 9. Where it is desired to install an artificial tooth where a natural tooth has been removed such as between the two teeth 36 and 37, cavities 38 and 39 are prepared in the teeth 36 and 37 respectively. The cavities 38 and 39 are then filled with wax which is then molded to restore the original contour of the teeth 36 and 37. A wax dummy tooth 40 corresponding to the missing natural tooth is fitted in between the teeth 36 and 37 and is connected to the wax patterns 41 and 42 in the cavities 38 and 39 of said teeth. This connection is made by application of sufficient heat to cause a merging of the patterns 41 and 42 at their points of contact or by applying a small amount of melted wax. A sprue 43 is attached to the dummy tooth 40 and a conductive coating 44 is then applied over the entire assembly of the wax tooth model 40 and the cavity patterns 41 and 42 on either side thereof. The assembly is then given a metallic coating 45 with vents 46 and 47 provided therein, and the wax pattern 40, 41 and 42 therein is then melted and removed from the mold 45 in the same manner as described in connection with the making of the inlay and the crown. The sprue 43 is then attached to the plastic material injecting apparatus and plastic material is then injected into the metallic mold 45. The sprue 43 and the stems of plastic formed therein and in the openings 46 and 47 are removed following the removal of the metallic coat as heretofore described. The bridge thus molded is then ready for installation.

Figure 10:
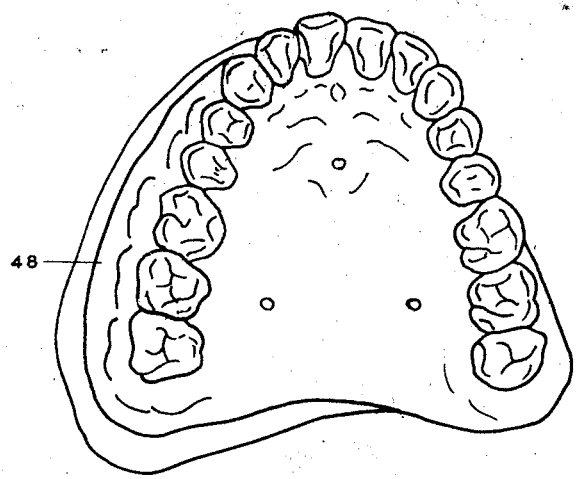
Fig. 10 is a perspective view of a denture.
Figure 11:
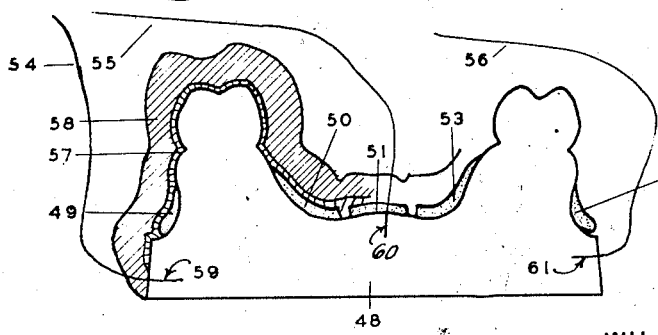
Figs. 11, 12, 13 and 14 are sectional views showing successive steps in making the denture of Fig. 10.

In the preparation of a denture in accordance with my invention, the first step is to obtain an impression of the natural teeth and surrounding tissue in suitable impression material in the usual manner and a wax pattern 48 (see Fig. 10) of the natural teeth and surrounding tissue is then made in the impression. In the event that any of the natural teeth are missing, corresponding wax teeth are substituted therefor in the wax pattern 48. The wax model 48 is thickened with additional wax in the localized areas which will correspond to the areas in the mouth where there will be no shrinkage of the tissues. The thickening is applied as shown at 49, 50, 51, 52, and 53 in Fig. 11. Wire conductors 54 and 55 and 56, or such other conductors as may be desired for proper distribution of electrical current are inserted into the wax model 48 as shown. All except the bottom surface of wax model 48 is then coated with suitable conductive material 57. A metallic coat 58 (see Fig. 11) is then built up by electro-deposition. The wax model 48 is melted and removed from the metallic mold 58 and the protruding ends 59, 60 and 61 of the wire conductors 54, 55 and 56 are cut off.

Figure 12:
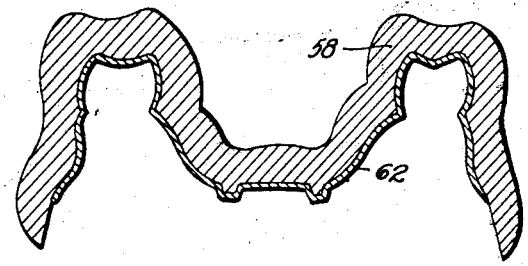

A thin plastic film, shown at 62 in Fig. 12, is then built up upon the interior of the metallic mold 58 and this may be done by an injective method or by spraying or by dipping into a molten plastic. The preferred method is by spraying and in this process a clear transparent plastic such as a styrene or acrylic resin may be used. This sprayed plastic sets immediately as a thin film 62.

Figure 13:
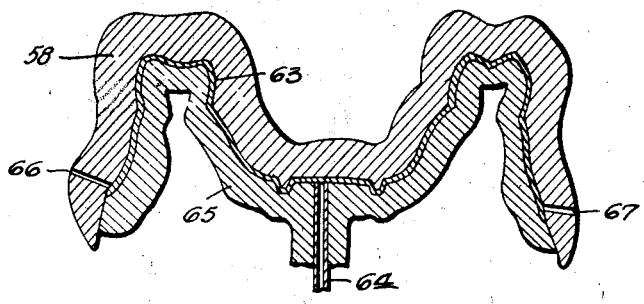
Figure 14:
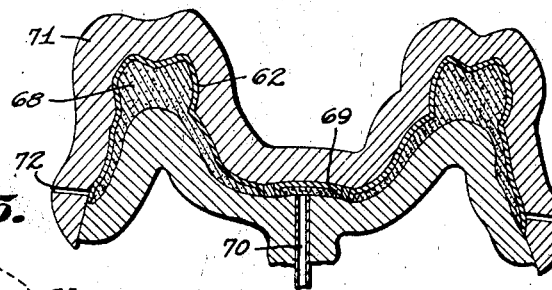

As an alternative the thin film 62 may be prepared by an injection method. If this process is used the metallic mold is dipped into molten wax in order to provide a thin wax coating thereover. If preferred, this wax coating shown at 63 in Fig. 13 may be applied by spraying or painting or by any other method. A sprue 64 is then attached to the wax coating 63 and the wax coating on the inside of metallic mold 58 is then coated with a conductive coating as heretofore described. A metallic coating 65 is then applied by electro-deposition as has been described previously and together with the mold 58 produces a closed mold containing the thin wax coating 63. This closed mold 58, 65 is then heated in order to melt the wax coating 63 and the said melted wax is then removed from the interior of the closed mold 58, 65. Vents 66—67 are provided in the mold walls in order to facilitate the injection of the plastic material throughout the entire interior of the mold 58, 65. The plastic is then injected through the sprue 64 as in the previously described injection method. After the plastic has been molded the mold 58, 65 is removed by any method as heretofore described and the projections formed in the vents and the sprue are removed. The plastic film 62 is then tinted and colored on its inner side in order to reproduce as accurately as possible, the exact appearance of the teeth and surrounding tissue of the patient for whom the denture is to be prepared.

After the patient's teeth have been extracted the plastic film 62 is filled with appropriate impression wax 68 and is placed in the patient's mouth in the position which the completed denture will occupy and the contour of ridge and adjacent tissues is impressed in the impression wax 68. In some instances this wax filled plastic film 62 may be used as a temporary denture until the ridge has been healed. During this time additional impression wax 68 may be added in order to insure proper adaptation.

The wax filled plastic film 62 has several upward projections 69 and the top portions of these are cut off and they are filled with wax.

A sprue 70 is attached to the wax filling 68 of the film 62 and the entire assembly is then coated with conductive substance as heretofore described and is then coated with a thickness of metal 71. Outlets 72 and 73 are then provided through the metallic coat 71, care being taken that the film 62 is not penetrated. The wax is then melted and removed and plastic is then injected. This plastic may be of suitable color and translucency or opacity depending upon the special requirements of the individual. The molded plastic is then removed from the metallic mold 71, by desolidifying the mold and upon removal of the projections formed by the sprue 70 and the outlets 72 and 73 the denture is completed.

Figures 15, 16, 17, 18:
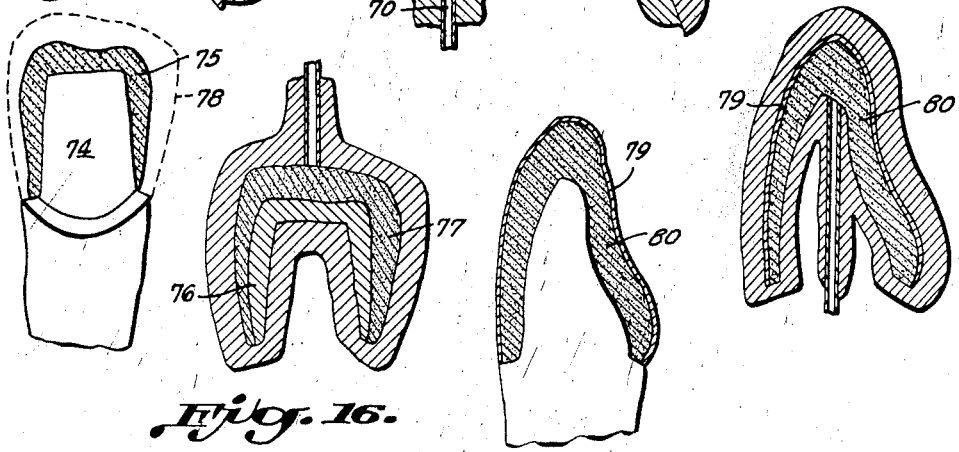
Fig. 15 is a perspective view of a tooth prepared for a crown and showing a step in the making of a laminated crown therefor.
Fig. 16 is a cross sectional view showing a further step in the molding of a laminated crown.
Fig. 17 is a sectional view of a plastic coated wax crown upon the stump of a tooth.
Fig. 18 is a cross sectional view of a metallic mold containing a plastic shell of a crown and adapted to have the remainder of said crown formed integrally therewith within the mold.

An alternative form of crown may be made, as shown in Figs. 15 and 16 in successive layers in order to provide a crown of the proper color, translucency and the like. The tooth stump 74 corresponding to the tooth stump 28 of Fig. 4 is coated with a thinner layer of wax 75 than the actual size of the tooth itself. The wax coat 75 is then removed and a plastic reproduction 76 is made in the same way as the crown was made as previously described. Subsequent wax coating 77 is built up on the initial layer 76 of the multiple layer crown. The combined plastic layer 76 and the wax layer 77 are coated with metal, the wax is removed, and plastic is injected so that the plastic layer 76 and the newly injected plastic form the integral crown which is represented by dotted lines at 78 in Fig. 15. This process may be repeated as many times as desired and plastics of various colors may be used. Likewise the thicknesses are varied so that the crown thus produced resembles as nearly as possible both the structural character and the appearance of the natural tooth.

The crown may also be made by the same method as was used in the making of the denture, by preparing a thin plastic film 79 (see Figs. 17 and 18) of the external contour of the tooth, tinting and coloring the internal surface and filling it with impression wax 80 and fitting it in place on the tooth stump, and then molding the plastic film in a metallic mold by the injection method as shown in Fig. 18.

While I have shown and described my invention in a preferred form, I am aware that various modifications can be made without departing from the spirit of my invention, the scope of which is to be determined by the appended claims.

What I claim is:

1. The method of making dental restorations of the class described which comprises preparing a pattern by solidifying a material in the dental restoration form, then solidifying another material on the pattern to form a mold with a mold cavity therein corresponding to the pattern, then desolidifying and removing the pattern from the mold cavity, then injecting and solidifying another material in the mold cavity, and then desolidifying and removing the mold from the solidifying material last mentioned.

2. The method of making dental restorations of the class described which comprises forming a mold by investing a meltable pattern of the dental restoration in a solidifiable material and solidifying the material on the pattern, then melting and removing the pattern from the mold, then injecting, compressing and solidifying a plastic material in the mold, and then desolidifying and removing the mold from the plastic material.

3. The method of making dental restorations of the class described which comprises enclosing a pattern of the dental restoration in an undivided one piece metal mold, then removing and replacing the pattern with a solidifiable plastic material and after solidification thereof in the mold, desolidifying and removing the undivided one piece mold progressively from the solidified plastic.

4. The method of making dental restorations of the class described, which comprises progressively accumulating and solidifying metal on a pattern of the restoration and thereby forming a metal mold with a cavity therein corresponding to the pattern, then melting and removing the pattern from the mold and replacing the removed pattern with a solidifiable plastic material and after solidification thereof in the mold, progressively desolidifying and removing the metal mold from the solidified plastic.

5. The method of making dental restorations of the class described which comprises coating a meltable pattern of the restoration with an electrically conductive material, then electro-depositing and solidifying a metal on the conductively coated pattern and thereby forming an undivided one piece metal mold with a cavity therein corresponding to the pattern, then melting and removing the pattern from the mold cavity, then injecting, compressing and solidifying a plastic material in the mold cavity and after solidification thereof, desolidifying and removing the metal mold from the solidified plastic.

6. The method of making dental restorations of the class described which comprises attaching a tube endwise to a meltable pattern of the restoration, then progressively accumulating and solidifying metal on the pattern and attached end of the tube and thereby forming an undivided one piece metal mold with a cavity therein containing the pattern and communicable through the tube with the exterior of the mold, then melting and removing the pattern from the cavity, then injecting a solidifiable plastic under pressure through the tube into the cavity, solidifying the plastic in said cavity and then desolidifying and removing the metal mold from the solidified plastic.

7. The method of making dental restorations of the class described which comprises preparing a partially formed restoration, then adding thereto a meltable material to complete the form of the restoration, then investing the combined partially formed restoration and added material in a solidifiable material to form a mold and after solidification thereof removing the meltable material and replacing same with a solidifiable compressed plastic and after solidification of the plastic desolidifying and removing the mold from the combined partially formed restoration and solidified plastic.

WILBERT A. WERNER.